May 15, 1923.

H. G. SCHOWE ET AL 1,455,451

AIR HOSE COUPLING

Filed April 8, 1921

Inventors
Harry G. Schowe
Henry J. Hansen
By John E. Brumbach
Atty.

Patented May 15, 1923.

1,455,451

UNITED STATES PATENT OFFICE.

HARRY G. SCHOWE AND HENRY J. HANSEN, OF CLEVELAND, OHIO, ASSIGNORS TO THE REX PRODUCTS COMPANY, OF CLEVELAND, OHIO, A CORPORATION OF OHIO.

AIR-HOSE COUPLING.

Application filed April 8, 1921. Serial No. 459,639.

*To all whom it may concern:*

Be it known that we, HARRY G. SCHOWE and HENRY J. HANSEN, citizens of the United States, residing at Cleveland, in the county of Cuyahoga and State of Ohio, have invented certain new and useful Improvements in Air-Hose Couplings, of which the following is a specification.

This invention relates to couplings especially adapted and intended for connecting an air hose to the stem of a tire or the like, such couplings being commonly used on air lines provided for inflating automobile tires, although of course it is capable for use in various other installations.

The object of the invention is to provide an improved coupling or connection which can be quickly attached or detached, the coupling being so constructed that it will slip over the top of the valve stem of the tire and may be put on or off with one hand regardless of the position of the stem. A further feature of the device is that the coupling is locked by a simple quarter turn, so that it cannot slip off accidentally, and the locking operation also acts to compress a packing against the tire stem so that it cannot leak. The device also has advantages of simplicity and cheapness, and the absence of springs or loose parts.

Figure 1:
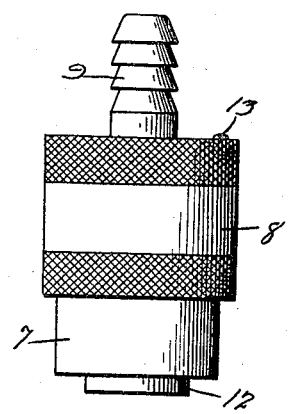
Figure 2:
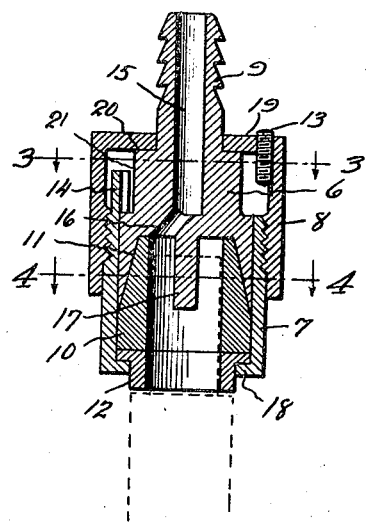
Figure 4:
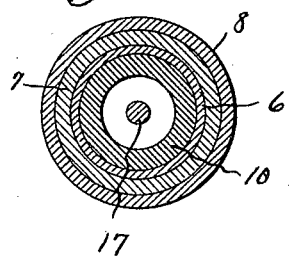
Figure 3:
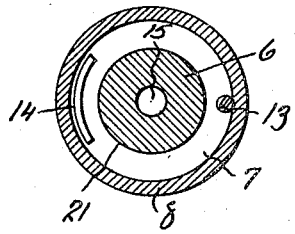

In the accompanying drawings Fig. 1 is a side elevation of the device. Fig. 2 is a longitudinal section. Figs. 3 and 4 are sections on the lines 3—3 and 4—4 in Fig. 2.

Referring specifically to the drawings, 6 indicates a head at the end of a nipple 9, which will be fastened to the air hose (not shown). The head and nipple have a bore 15 communicating through an inclined bore 16 with a cupped cavity in the face of the head 6, said cavity having an inclined wall 11 forming a tapered socket, and at the center of the socket is a projecting pin 17, the purpose of which is to press against the well-known valve stem or tire valve to open the latter when the coupling is applied.

Fitting in the socket 11 is a tapered rubber ring or packing 10 which is adapted to be compressed to grip the stem of a tire when the coupling is applied thereto. This rubber is confined between the head 6 and the flanged ring 12 which serves as a guide to enter the tire stem (not shown) into the coupling. This ring 12 is carried by a flange 18 at the lower end of a sleeve 7 which has a sliding fit around the enlarged end of the head 6. The outer end of the sleeve 7 is exteriorly threaded to receive a screw cap 8 which has a flange 19 at the top fitting around the nipple 9 and engaging behind a shoulder 20 at the top of the head 6. The head 6 is reduced in diameter for a part of its length, as indicated at 21, forming an annular recess or space into which projects a segmental projection 14 at the inner end of the sleeve 7. And the cap 8 carries a screw pin 13 which is tapped through the top or if desired through the side of the cap and projects in position to stop against either side edge of the projecton 14, thereby limiting the extent to which the screw cap 8 can be turned, and, in effect, locking them together by preventing the cap from being completely unscrewed.

In use, the cap 8 is unscrewed which has the effect of releasing the pressure on the ring 10 and permitting said ring to assume a normal expanded position. The coupling is then slipped on to the valve stem of the tire and pressed down until the flange ring 12 contacts with the usual shoulder on the tire stem, thereby pressing the packing ring 10 and causing its bore to contract to a close grip with the sides of the tire stem, and this action is assisted and the coupling is fastened by turning the cap 8 which draws the parts 7 and 8 together and locks the coupling on the stem, the screw action also causing or assisting the compression and contraction of the packing ring 10, particularly in consequence of the inclination of the wall 11 of the head, which has a wedge action against the packing ring and presses it inwardly to air-tight connection with the valve stem. The stop 14, cooperating with the screw 13, prevents the cap 8 being turned too far in either direction. The device may be applied with one hand, because when it is pressed down on the valve stem the pressure causes an expansion of the packing ring 10 which grips the part 7 with respect to the valve stem, and so holds the said part while the cap 8 is given a slight turn to lock it, the part 7 not turning in consequence of its grip on the stem. To release the coupling it is only necessary to reverse the turn of the cap 8 and pull the coupling off the stem. The device may be very quickly and easily operated, and it will not be necessary to hold the coupling on the valve stem by main force, as is often necessary with other couplings. This coupling can be located on the stem and then both hands may be free to operate a pump, in case a pump is used. The action is also much quicker than ordinary screw couplings which have to be screwed on and off the stem.

We claim:

1. A coupling comprising a head provided with means to connect the same to a hose, said head having a tapered socket in its front end, a sleeve slidable on the head, a flange ring carried at the front end of the sleeve and slidable therein, a tapered packing ring fitting in the socket and confined therein by a flange ring, and a cap connecting the head and the sleeve and having a screw engagement with the latter.

2. A coupling comprising a head having a socket in its front end, a packing ring fitting in the socket, a sleeve confining the packing in the socket and having a rearwardly extending stop projection, and a screw cap connecting the head and the sleeve and having a pin cooperating with said projection to limit the turn of the cap.

In testimony whereof, we affix our signatures in presence of two witnesses.

HARRY G. SCHOWE.
HENRY J. HANSEN.

Witnesses:
   JOHN A. BOMMHARDT,
   BESSIE F. POLLAK.